O'DELL KING, T. H. FOX & J. L. O. KING.
NUT AND BOLT LOCK.
APPLICATION FILED DEC. 21, 1914.
1,138,574.
Patented May 4, 1915.
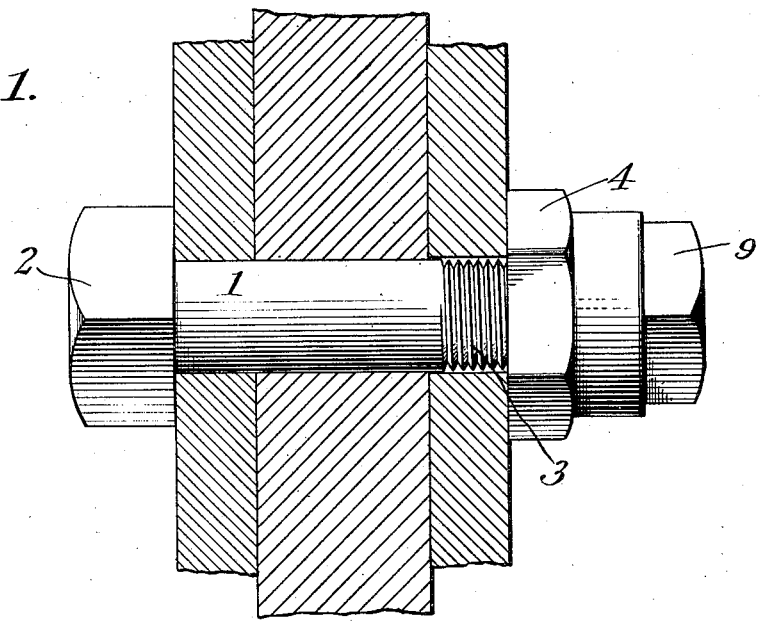
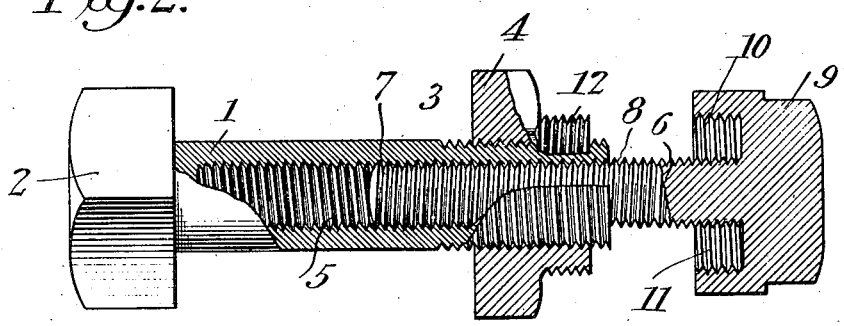

UNITED STATES PATENT OFFICE.

O'DELL KING, THOMAS HALSEY FOX, AND JAMES LARENCE ORR KING, OF SANDY SPRINGS, SOUTH CAROLINA.

NUT AND BOLT LOCK.

1,138,574. Specification of Letters Patent. Patented May 4, 1915.

Application filed December 21, 1914. Serial No. 878,325.

*To all whom it may concern:*

Be it known that we, O'DELL KING, THOMAS H. FOX, and JAMES L. O. KING, citizens of the United States, residing at Sandy Springs, in the county of Anderson and State of South Carolina, have invented certain new and useful Improvements in Nut and Bolt Locks; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in nut and bolt locks and it has for its object to produce a device of this character which will serve to positively lock a nut upon a bolt against the possibility of its being accidentally released.

To these ends and to such others as the invention may pertain, the same consists in the peculiar construction, novel arrangement, combination and adaptation of parts, all as will be more fully hereinafter described, shown in the accompanying drawings and then specifically defined in the appended claim.

The invention is illustrated in the accompanying drawings which, with the numerals of reference marked thereon form a part of this specification and in which:—

Figure 1 is a side elevation of the nut locking device embodying our invention, the parts being shown as locked in position and Fig. 2 is a longitudinal section view in which the nut is shown as removed from its seat.

Reference now being had to the details of the drawings by numerals, 1 is a bolt provided at one of its ends with a head 2, the free end being screw-threaded as shown at 3.

4 is a nut, internally screw-threaded to engage the right hand threads 3 upon the bolt, the hollow interior of the bolt 1 being provided with left hand screw threads 5.

6 is a screw or bolt having a diameter equal to the hollow interior screw-threaded chamber 7 of the bolt 1, the shank portion of the screw or bolt 6 being provided with a left hand screw thread 8 adapted to engage the interior threads 5 within the chamber of the bolt 1. The enlarged end 9 of the shank portion of the bolt 6 is provided at its inner end with an interiorly left hand threaded chamber 10, the thread 11 within the bolt head being adapted to engage the left hand threads 12 upon the outer end of the nut 4.

Having thus described our invention, what we claim to be new and desire to secure by Letters Patent is:

In combination with a bolt having a head and a circumferentially threaded shank portion, said bolt being hollow and the wall interiorly-threaded, a nut fitted over the circumferentially threaded part of the bolt and having a shoulder which is circumferentially threaded, a nut having an integral screw projecting therefrom for engagement with the interior threads of the bolt, and a head with a flange interiorly threaded and adapted to fit over the threaded shoulder of said nut.

In testimony whereof we hereunto affix our signatures in presence of two witnesses.

O'DELL KING.
THOMAS HALSEY FOX.
JAMES LARENCE ORR KING.

Witnesses.
Y. R. RIELEY,
DARWIN L. REID.